US011708070B2

(12) United States Patent
Shimizu et al.

(10) Patent No.: US 11,708,070 B2
(45) Date of Patent: Jul. 25, 2023

(54) DETECTING AN OBJECT OUTSIDE OF A FIELD OF VIEW

(71) Applicant: Toyota Motor Engineering & Manufacturing North America, Inc., Plano, TX (US)

(72) Inventors: Takayuki Shimizu, Mountain View, CA (US); Onur Altintas, Mountain View, CA (US); Chang-Heng Wang, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 324 days.

(21) Appl. No.: 17/002,935

(22) Filed: Aug. 26, 2020

(65) Prior Publication Data

US 2022/0063602 A1 Mar. 3, 2022

(51) Int. Cl.
*B60W 30/09* (2012.01)
*G01S 13/931* (2020.01)
(Continued)

(52) U.S. Cl.
CPC .......... *B60W 30/09* (2013.01); *B60W 30/095* (2013.01); *B60W 50/14* (2013.01); *G01S 13/42* (2013.01); *G01S 13/58* (2013.01); *G01S 13/931* (2013.01); *B60W 2420/52* (2013.01); *B60W 2554/4041* (2020.02); *B60W 2556/45* (2020.02)

(58) Field of Classification Search
CPC .... B60W 30/09; B60W 30/095; B60W 50/14; B60W 2554/4041; B60W 2556/45; B60W 2420/52; G01S 13/42; G01S 13/58; G01S 13/931
See application file for complete search history.

(56) References Cited

U.S. PATENT DOCUMENTS

| 2017/0178498 A1* | 6/2017 | Mcerlean | G08G 1/163 |
| 2017/0287334 A1* | 10/2017 | Slutsky | G01S 13/42 |

(Continued)

OTHER PUBLICATIONS

Scheiner et al., "Seeing Around Street Corners: Non-Line-of-Sight Detection and Tracking In-theWild Using Doppler Radar", Computer Vision Foundation, 2020, 10 pages.

(Continued)

*Primary Examiner* — Tarek Elarabi
(74) *Attorney, Agent, or Firm* — Christopher G. Darrow; Darrow Mustafa PC

(57) ABSTRACT

A message can be received from a first object. The message can include information about a position of the first object. An electromagnetic energy can be caused to be transmitted in a direction of the first object at a time in which the first object is in motion. A reflection of the electromagnetic energy can be received from the direction of the first object. A first possible position of a second object can be determined based on the reflection of the electromagnetic energy having traveled entirely along a path defined by a line formed by the first object and the vehicle. A second possible position of the second object can be determined based on the reflection of the electromagnetic energy having traveled along a path outside of the line. An actual position of the second object being the second possible position of the second object can be determined.

20 Claims, 6 Drawing Sheets

(51) Int. Cl.
*G01S 13/42* (2006.01)
*G01S 13/58* (2006.01)
*B60W 50/14* (2020.01)
*B60W 30/095* (2012.01)

(56) References Cited

U.S. PATENT DOCUMENTS

| | | | |
|---|---|---|---|
| 2017/0371338 A1* | 12/2017 | Kamata | G05D 1/0274 |
| 2018/0319280 A1* | 11/2018 | Kim | G01S 13/931 |
| 2019/0339349 A1* | 11/2019 | Harrison | G01S 5/14 |
| 2020/0132826 A1 | 4/2020 | Achour | |
| 2020/0163040 A1* | 5/2020 | Trichopoulos | H04B 7/0617 |
| 2020/0326726 A1* | 10/2020 | Vassilovski | H04W 4/40 |
| 2022/0026919 A1* | 1/2022 | Micks | G05D 1/0274 |
| 2022/0103986 A1* | 3/2022 | Hwang | G08G 1/0141 |

OTHER PUBLICATIONS

Chellapilla, "Rethinking Maps for Self-Driving", Apr. 27, 2020, 11 pages.
Ingrassia et al., "How Google is shaping the rules of the driverless road", From Here to Autonomy, Austin, TX, Apr. 26, 2020, 18 pages.
Thandavarayan et al., "Generation of Cooperative Perception Messages for Connected and Automated Vehicles", Cornell University, submitted Aug. 29, 2019, 6 pages.
Velten et al., "CORNAR: Looking Around Corners using Femto-Photography", Mar. 2012, 5 pages.
Thandavarayan et al., "Analysis of Message Generation Rules for Collective Perception in Connection and Automated Driving", 2019 IEEE Intelligent Vehicles Symposium (IV), Jun. 9-12, 2019, 6 pages.
Baek et al., "Vehicle Trajectory Prediction and Collision Warning via Fusion of Multisensors and Wireless Vehicular Communications", MDPI, published Jan. 4, 2020, 26 pages.
Bouman et al., "Turning corners into Cameras: Principles and Methods", ICCV, May 29, 2020, 2 pages.
Unknown, "Toyota to Bring Vehicle-Infrastructure Cooperative Systems to New Models in 2015", Nov. 26, 2014, 5 pages.
Kubota, "Stanford researchers develop technique to see objects hidden around corners", Stanford News, Mar. 5, 2018, 4 pages.

* cited by examiner

DETECTING AN OBJECT OUTSIDE OF A FIELD OF VIEW

TECHNICAL FIELD

The disclosed technologies are directed to detecting an object that is outside of a field of view. Specifically, the disclosed technologies are directed to detecting, at a vehicle and by using multiple technologies including multiple reflections of electromagnetic energy, an object that is outside of a field of view.

BACKGROUND

Historically, operation of a vehicle in a manner that avoids a collision with another object has depended upon the efficacies of the senses of an operator of the vehicle. In the past few decades, technologies have been developed to provide additional information to the operator of the vehicle so that the vehicle can be operated in a manner that avoids a collision with another object. Such technologies can include, for example, sensors disposed on the vehicle, "connected car" technology, high definition maps, and the like.

Sensors disposed on the vehicle can include, for example, one or more of global navigation satellite systems (GNNS), inertial measurement units (IMU), image sensors, cameras, radar systems, light detection and ranging (LIDAR) systems, ultrasonic systems, or the like.

"Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

"Vehicle to Vehicle" technology can be used, for example, to communicate a Basic Safety Message (BSM), a Collective Perception Message (CPM), or both. A Basic Safety Message can be used to communicate, to another vehicle, information about a vehicle that transmits the Basic Safety Message. Such information can include, for example, a position of the vehicle, a heading direction of the vehicle, a speed of the vehicle, a rate of acceleration of the vehicle, a size of the vehicle, and information about a status of brakes of the vehicle. A Collective Perception Message can be used to communicate, to another vehicle, information obtained from sensors disposed on a vehicle that transmits the Collective Perception Message. Such information can include, for example, a position of the vehicle, a distance and a direction from the vehicle to a detected object, a speed of the detected object, a size of the detected object, and a time at which the detected object was detected.

A high definition map can be a digital map that includes additional information beyond that which is presented in a conventional paper road map. A high definition map can be characterized as having layers of additional information. Each layer of additional information can be associated with a specific category of additional information. These layers can include, for example, a base map layer, a geometric map layer, a semantic map layer, a map priors layer, and a real-time knowledge layer. The base map layer, the geometric map layer, and the semantic map layer can include information about static aspects of a location. The map priors layer and the real-time knowledge layer can include information about dynamic aspects of the location. The maps priors layer can include historic dynamic information related to the location. The historic dynamic information can include, for example, an order of a cycle of states of a traffic light (e.g., (1) protected-left, green, yellow, red; (2) green, protected-left, yellow, red; etc.); a duration of time of each of the states; a likelihood that, at a specific time, a vehicle will be parked in a specific lane; or the like. The real-time knowledge layer can include real-time traffic information. The real-time traffic information can include, for example, information about an actual speed of traffic at the location, information about a construction zone at the location, or the like.

SUMMARY

In an embodiment, a system for detecting an object can include one or more processors and a memory. The one or more processors can be disposed on a vehicle. The one or more processors can be configured to receive, from a first object, a message. The message can include information about a position of the first object. The memory can be communicably coupled to the one or more processors. The memory can store a detection and ranging device control module and a position determination module. The detection and ranging device control module can include instructions that when executed by the one or more processors cause the one or more processors to cause an electromagnetic energy to be transmitted in a direction of the first object at a time in which the first object is in motion. The detection and ranging device control module can include instructions that when executed by the one or more processors cause the one or more processors to receive a reflection of the electromagnetic energy from the direction of the first object. The position determination module can include instructions that when executed by the one or more processors cause the one or more processors to determine, from the reflection of the electromagnetic energy: (1) a first possible position of a second object based on the reflection of the electromagnetic energy having traveled entirely along a path defined by a line formed by the first object and the vehicle and (2) a second possible position of the second object based on the reflection of the electromagnetic energy having traveled along a path outside of the line. The position determination module can include instructions that when executed by the one or more processors cause the one or more processors to determine that an actual position of the second object is the second possible position of the second object.

In another embodiment, a method for detecting an object can include receiving, by a processor disposed on a vehicle and from a first object, a message. The message can include information about a position of the first object. The method can include causing, by the processor, an electromagnetic energy to be transmitted in a direction of the first object at a time in which the first object is in motion. The method can include receiving, by the processor, a reflection of the electromagnetic energy from the direction of the first object. The method can include determining, by the processor and from the reflection of the electromagnetic energy: (1) a first possible position of a second object based on the reflection of the electromagnetic energy having traveled entirely along a path defined by a line formed by the first object and the vehicle and (2) a second possible position of the second object based on the reflection of the electromagnetic energy having traveled along a path outside of the line. The method can include determining, by the processor, that an actual position of the second object is the second possible position of the second object.

In another embodiment, a system for detecting an object can include one or more processors and a memory. The one or more processors can be disposed on a vehicle. The one or more processors can be configured to receive, from a first object, a message. The message can include information about a position of a second object. The memory can be communicably coupled to the one or more processors. The memory can store a detection and ranging device control module and a position determination module. The detection and ranging device control module can include instructions that when executed by the one or more processors cause the one or more processors to cause an electromagnetic energy to be transmitted in a direction of the second object at a time in which the second object is in motion. The detection and ranging device control module can include instructions that when executed by the one or more processors cause the one or more processors to receive a reflection of the electromagnetic energy from the direction of the second object. The position determination module can include instructions that when executed by the one or more processors cause the one or more processors to determine, from the reflection of the electromagnetic energy: (1) a first possible position of a third object based on the reflection of the electromagnetic energy having traveled entirely along a path defined by a line formed by the second object and the vehicle and (2) a second possible position of the third object based on the reflection of the electromagnetic energy having traveled along a path outside of the line. The position determination module can include instructions that when executed by the one or more processors cause the one or more processors to determine that an actual position of the third object is the second possible position of the third object.

In another embodiment, a method for detecting an object can include receiving, by a processor disposed on a vehicle and from a first object, a message. The message can include information about a position of a second object. The method can include causing, by the processor, an electromagnetic energy to be transmitted in a direction of the second object at a time in which the second object is in motion. The method can include receiving, by the processor, a reflection of the electromagnetic energy from the direction of the second object. The method can include determining, by the processor and from the reflection of the electromagnetic energy: (1) a first possible position of a third object based on the reflection of the electromagnetic energy having traveled entirely along a path defined by a line formed by the second object and the vehicle and (2) a second possible position of the third object based on the reflection of the electromagnetic energy having traveled along a path outside of the line. The method can include determining, by the processor, that an actual position of the third object is the second possible position of the third object.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
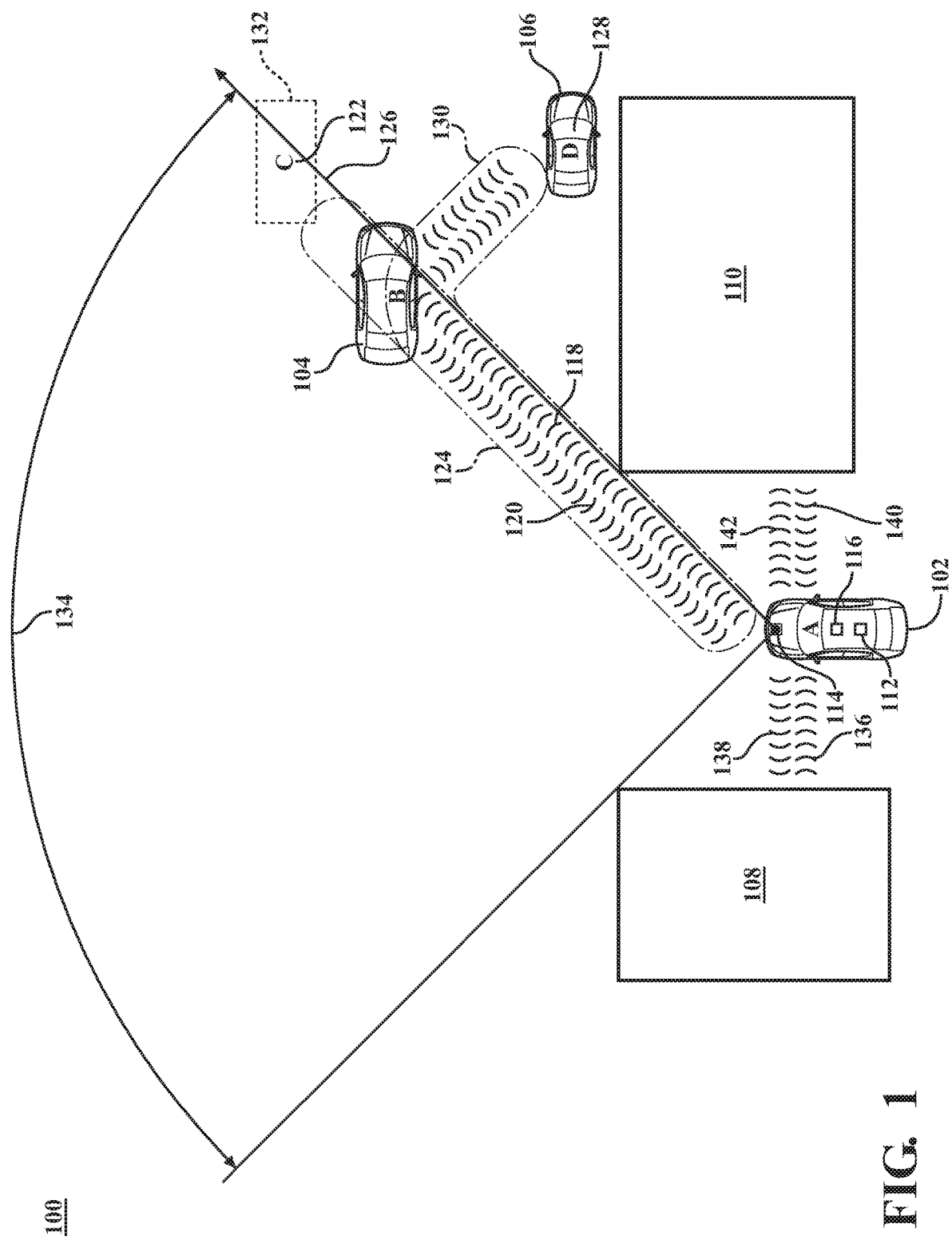
FIG. 1 is a diagram that includes a first example of an environment for detecting, by a vehicle, an object, according to the disclosed technologies.

The disclosed technologies are directed to detecting an object that is outside of a field of view. Specifically, the disclosed technologies are directed to detecting, at a vehicle and by using multiple technologies including multiple reflections of electromagnetic energy, an object that is outside of a field of view. Although a map priors layer and a real-time knowledge layer of a high definition map can include information about dynamic aspects of a location, such information can be limited to dynamic information about relatively static objects at the location (e.g., the map priors layer) or to aggregate dynamic information about dynamic objects at the location (e.g., the real-time knowledge layer). The disclosed technologies can address these limitations. The disclosed technologies can use multiple technologies, specifically "Vehicle to Everything" communications technology and radar, to provide information about discrete dynamic objects at the location. The disclosed technologies can use the multiple technologies in a manner that capitalizes on one or more advantages of each specific technology. For example, a radar system disposed on the vehicle can have an effective range of about 250 meters and can sweep through an arc of 360 degrees in about 50 milliseconds, while "Vehicle to Everything" communications technology can communicate messages that have an effective range of about 1,000 meters and are communicated at a rate of about once every 100 milliseconds.

In a first alternative implementation, a message from a first object can be received at a vehicle. The message can include information about a position of the first object. An electromagnetic energy can be caused to be transmitted in a direction of the first object at a time in which the first object is in motion. A reflection of the electromagnetic energy can be received from the direction of the first object. A first possible position of a second object can be determined from the reflection of the electromagnetic energy based on the reflection of the electromagnetic energy having traveled entirely along a path defined by a line formed by the first object and the vehicle. A second possible position of the second object can be determined from the reflection of the electromagnetic energy based on the reflection of the electromagnetic energy having traveled along a path outside of the line. An actual position of the second object can be determined to be the second possible position of the second object.

In a second alternative implementation, a message from a first object can be received at a vehicle. The message can include information about a position of a second object. An electromagnetic energy can be caused to be transmitted in a direction of the second object at a time in which the second object is in motion. A reflection of the electromagnetic energy can be received from the direction of the second object. A first possible position of a third object can be determined from the reflection of the electromagnetic energy based on the reflection of the electromagnetic energy having traveled entirely along a path defined by a line formed by the second object and the vehicle. A second possible position of the third object can be determined from the reflection of the electromagnetic energy based on the reflection of the electromagnetic energy having traveled along a path outside of the line. An actual position of the third object can be determined to be the second possible position of the third object.

FIG. 1 is a diagram that includes a first example of an environment 100 for detecting, by a vehicle 102, an object, according to the disclosed technologies. The first example of the environment 100 can include the vehicle 102, a first object 104 (e.g., a first other vehicle) and a second object 106 (e.g., a second other vehicle). Additionally, the first example of the environment 100 can include a first obstacle 108 and a second obstacle 110. Additionally, the vehicle 102 can include, for example, a "Vehicle to Everything" communications device 112. Additionally, the vehicle 102 can include, for example, a detection and ranging device 114. Additionally, the vehicle 102 can include, for example, a device 116. The device 116 can improve a safety of an operation of the vehicle 102.

Figure 2:
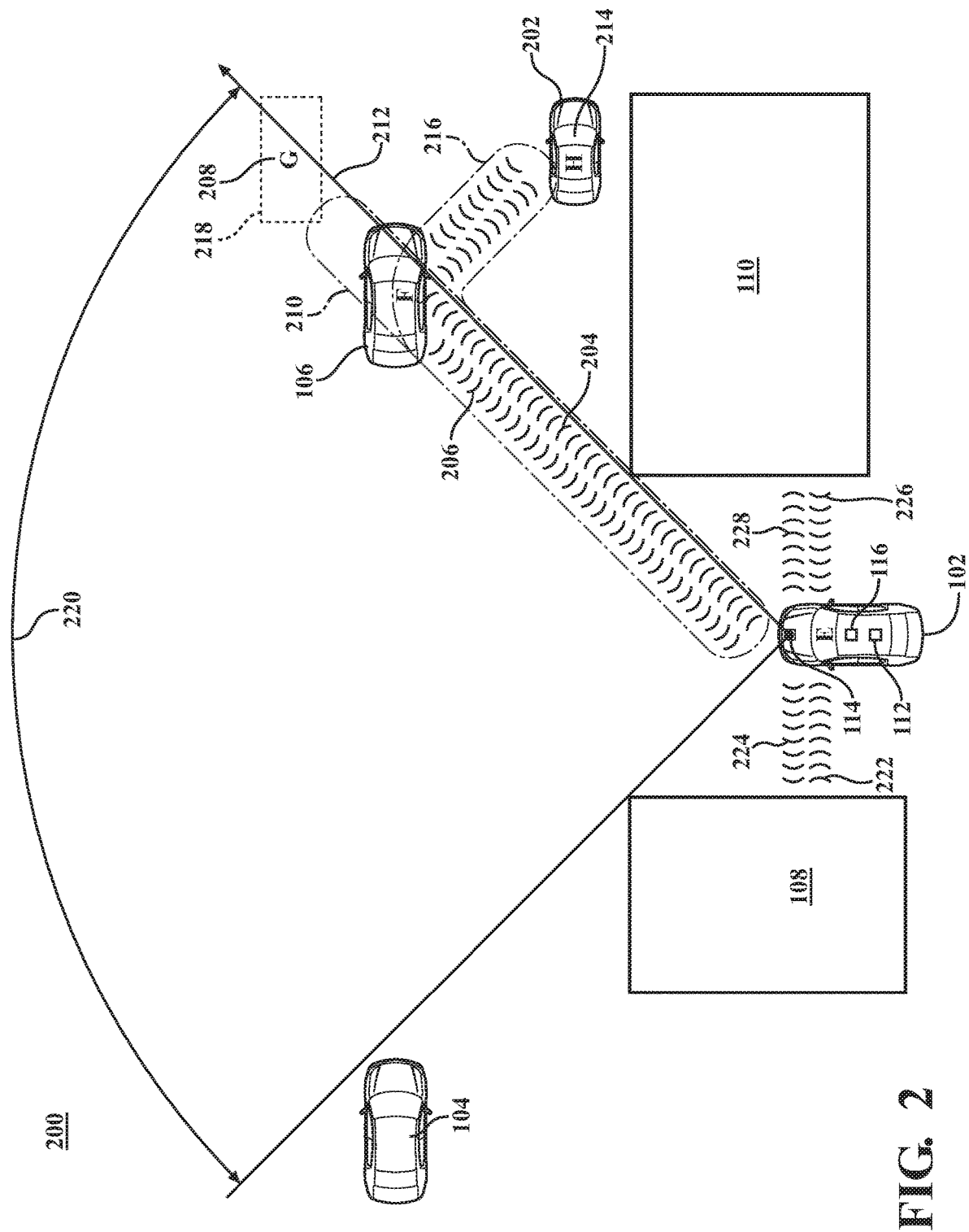
FIG. 2 is a diagram that includes a second example of the environment for detecting, by the vehicle, the object, according to the disclosed technologies.

FIG. 2 is a diagram that includes a second example of the environment 200 for detecting, by the vehicle 102, the object, according to the disclosed technologies. The second example of the environment 200 can include the vehicle 102, the first object 104 (e.g., the first other vehicle), the second object 106 (e.g., the second other vehicle), and a third object 202 (e.g., a third other vehicle). Additionally, the second example of the environment 200 can include the first obstacle 108 and the second obstacle 110. Additionally, the vehicle 102 can include, for example, the "Vehicle to Everything" communications device 112. Additionally, the vehicle 102 can include, for example, the detection and ranging device 114. Additionally, the vehicle 102 can include, for example, a device 116. The device 116 can improve a safety of an operation of the vehicle 102.

Figure 3:
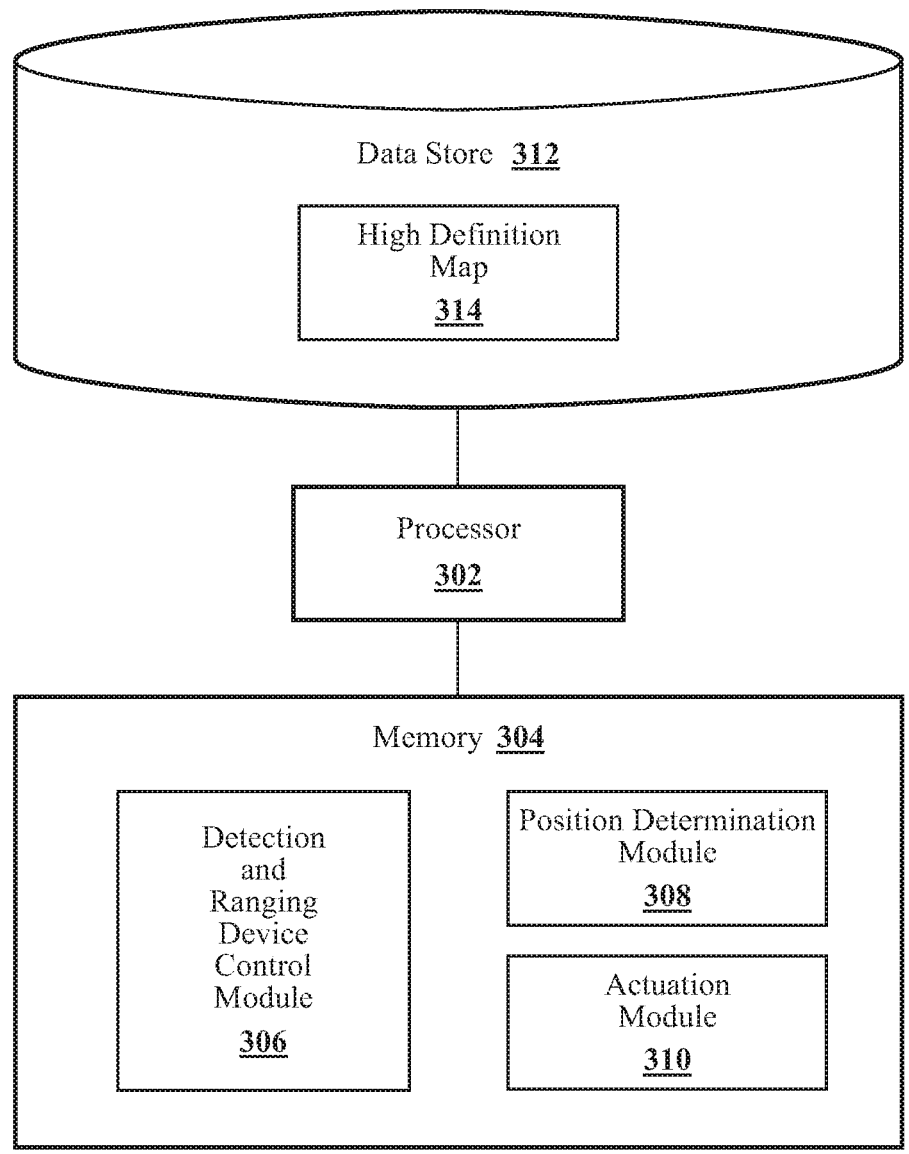
FIG. 3 is a block diagram that illustrates an example of a system for detecting an object, according to the disclosed technologies.

FIG. 3 is a block diagram that illustrates an example of a system 300 for detecting an object, according to the disclosed technologies. The system 300 can include, for example, a processor 302 and a memory 304. The processor 302 can be disposed on a vehicle (e.g., the vehicle 102 illustrated in FIGS. 1 and 2). The memory 304 can be communicably coupled to the processor 302. The memory 304 can store, for example, a detection and ranging device control module 306 and a position determination module 308.

The processor 302 can be configured to receive, from a first object (e.g., the first object 104 (e.g., the first other vehicle) illustrated in FIGS. 1 and 2), a message. For example, the processor 302 can be configured to receive the message through a wireless communications channel. For example, the wireless communications channel can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. In a first alternative implementation, the message can include information about a position of the first object (e.g., the first object 104 (e.g., the first other vehicle) illustrated in FIG. 1). For example, the message can include information about a size of the first object. For example, the message can include a Basic Safety Message (BSM). In a second alternative implementation, the message can include information about a position of a second object (e.g., the second object 106 (e.g., the second other vehicle) illustrated in FIG. 2). For example, the message can include information about a size of the second object. For example, the message can include a Collective Perception Message (CPM). For example, the message may lack information about a position of a third object (e.g., the third object 202 (e.g., the third other vehicle) illustrated in FIG. 2). For example, a distance between the first object and the third object may be greater than an effective range of sensors disposed on the first object.

In the first alternative implementation, the detection and ranging device control module 306 can include instructions that function to control the processor 302 to cause an electromagnetic energy to be transmitted in a direction of the first object (e.g., the first object 104 (e.g., the first other vehicle) illustrated in FIG. 1) at a time in which the first object is in motion.

For example, the instructions to cause the electromagnetic energy to be transmitted can include instructions that function to control the processor 302 to cause a detection and ranging device to transmit the electromagnetic energy. For example, the detection and ranging device can include a radar device. For example, the radar device can include a millimeter wave radar device. With reference to FIG. 1, for example, the detection and ranging device 114 can cause the electromagnetic energy 118 to be transmitted in the direction of the first object 104 (e.g., the first other vehicle) at a time in which the first object 104 is in motion. Returning to FIG. 3, the detection and ranging device control module 306 can include instructions that function to control the processor 302 to receive a reflection of the electromagnetic energy from the direction of the first object. With reference to FIG. 1, for example, the detection and ranging device 114 can receive a reflection 120 of the electromagnetic energy 118 from the direction of the first object 104 (e.g., the first other vehicle).

Returning to FIG. 3, in the second alternative implementation, the detection and ranging device control module 306 can include instructions that function to control the processor 302 to cause an electromagnetic energy to be transmitted in a direction of the second object (e.g., the second object 106 (e.g., the second other vehicle) illustrated in FIG. 2) at a time in which the second object is in motion.

For example, the instructions to cause an electromagnetic energy to be transmitted can include instructions that function to control the processor 302 to cause the electromagnetic energy to be transmitted in response to a determination that the second object is within a range of a detection and ranging device that produces the electromagnetic energy. With reference to FIG. 2, for example, the detection and ranging device 114 can cause an electromagnetic energy 204 to be transmitted in response to a determination that the second object 106 (e.g., the second other vehicle) is within a range of the detection and ranging device 114.

Returning to FIG. 3, for example, the instructions to cause an electromagnetic energy to be transmitted can include instructions that function to control the processor 302 to cause a detection and ranging device to transmit the electromagnetic energy. For example, the detection and ranging device can include a radar device. For example, the radar device can include a millimeter wave radar device. With reference to FIG. 2, for example, the detection and ranging device 114 can cause the electromagnetic energy 204 to be transmitted in the direction of the second object 106 (e.g., the second other vehicle) at a time in which the second object 106 is in motion. Returning to FIG. 3, the detection and ranging device control module 306 can include instructions that function to control the processor 302 to receive a reflection of the electromagnetic energy from the direction of the second object. With reference to FIG. 2, for example, the detection and ranging device 114 can receive a reflection 206 of the electromagnetic energy 204 from the direction of the second object 106 (e.g., the second other vehicle).

Returning to FIG. 3, in the first alternative implementation, the position determination module 308 can include instructions that function to control the processor 302 to determine, from the reflection of the electromagnetic energy: (1) a first possible position of a second object based on the reflection of the electromagnetic energy having traveled entirely along a path defined by a line formed by the first object and the vehicle and (2) a second possible position of the second object based on the reflection of the electromagnetic energy having traveled along a path outside of this line. With reference to FIG. 1, for example: (1) the first possible position of the second object 106 (e.g., the second other vehicle) can be a position 122 based on the reflection 120 of the electromagnetic energy 118 having traveled entirely along a path 124 defined by a line 126 formed by the first object 104 (e.g., the first other vehicle) and the vehicle 102 and (2) the second possible position of the second object 106 can be a position 128 based on the reflection 120 of the electromagnetic energy 118 having traveled along a path 130 outside of the line 126. For example, the path 124 can be defined from a point A to a point B to a point C, and the path 130 can be defined from the point A to the point B to a point D. A distance of the path 124 can be equal to a sum of a distance from the point A to the point B added to a distance from the point B to the point C. A distance of the path 130 can be equal to a sum of the distance from the point A to the point B added to a distance from the point B to the point D. The distance of the path 124 can be equal to the distance of the path 130.

Returning to FIG. 3, in the second alternative implementation, the position determination module 308 can include instructions that function to control the processor 302 to determine, from the reflection of the electromagnetic energy: (1) a first possible position of a third object based on the reflection of the electromagnetic energy having traveled entirely along a path defined by a line formed by the second object and the vehicle and (2) a second possible position of the third object based on the reflection of the electromagnetic energy having traveled along a path outside of this line. With reference to FIG. 2, for example: (1) the first possible position of the third object 202 (e.g., the third other vehicle) can be a position 208 based on the reflection 206 of the electromagnetic energy 204 having traveled entirely along a path 210 defined by a line 212 formed by the second object 106 (e.g., the second other vehicle) and the vehicle 102 and (2) the second possible position of the second object 106 can be a position 214 based on the reflection 206 of the electromagnetic energy 202 having traveled along a path 216 outside of the line 212. For example, the path 210 can be defined from a point E to a point F to a point G, and the path 214 can be defined from the point E to the point F to a point H. A distance of the path 210 can be equal to a sum of a distance from the point E to the point F added to a distance from the point F to the point G. A distance of the path 216 can be equal to a sum of the distance from the point E to the point F added to a distance from the point F to the point H. The distance of the path 210 can be equal to the distance of the path 216.

Returning to FIG. 3, in the first alternative implementation, the position determination module 308 can include instructions that function to control the processor 302 to determine that an actual position of the second object (e.g., the second object 106 (e.g., the second other vehicle) illustrated in FIG. 1) is the second possible position of the second object.

For example, the instructions to determine that the actual position of the second object (e.g., the second object 106 (e.g., the second other vehicle) illustrated in FIG. 1) is the second possible position can include instructions that function to control the processor 302 to cause the processor 302 to determine, in a manner that accounts for the motion of the first object (e.g., the first object 104 (e.g., the first other vehicle) illustrated in FIG. 1), that the actual position of the second object is the second possible position of the second object.

For example, the instructions to determine that the actual position of the second object is the second possible position can include instructions that function to control the processor 302 to determine that a third object is at the first possible position of the second object. With reference to FIG. 1, for example, a third object 132 can be at the position 122. Because the third object 132 is at the position 122, the position 122 cannot be the actual position of the second object 106 so that the processor 302 can determine that the position 128 is the actual position of the second object 106.

Returning to FIG. 3, for example, if the message includes information about a size of the first object (e.g., the first object 104 (e.g., the first other vehicle) illustrated in FIG. 1), then the instructions that function to determine that the actual position of the second object (e.g., the second object 106 (e.g., the second other vehicle) illustrated in FIG. 1) is the second possible position can include instructions that function to control the processor 302 to determine that a size of the second object is smaller than the size of the first object. That is, because: (1) the size of the second object is smaller than the size of the first object and (2) the first possible position is along the line formed by the first object and the vehicle, the first possible position cannot be the actual position of the second object and the processor 302 can determine that the second possible position is the actual position of the second object.

In the second alternative implementation, the position determination module 308 can include instructions that function to control the processor 302 to determine that an actual position of the third object (e.g., the third object 202 (e.g., the third other vehicle) illustrated in FIG. 2) is the second possible position of the third object.

For example, the instructions to determine that the actual position of the third object (e.g., the third object 202 (e.g., the third other vehicle) illustrated in FIG. 2) is the second possible position can include instructions that function to control the processor 302 to cause the processor 302 to determine, in a manner that accounts for the motion of the first object (e.g., the first object 104 (e.g., the first other vehicle) illustrated in FIG. 2), the second object (e.g., the second object 106 (e.g., the second other vehicle) illustrated in FIG. 2), or both, that the actual position of the third object is the second possible position of the third object.

For example, the instructions to determine that the actual position of the third object is the second possible position can include instructions that function to control the processor 302 to determine that a fourth object is at the first possible position of the second object. With reference to FIG. 2, for example, a fourth object 218 can be at the position 208. Because the fourth object 218 is at the position 208, the position 208 cannot be the actual position of the third object 202 so that the processor 302 can determine that the position 214 is the actual position of the third object 202.

Returning to FIG. 3, for example, if the message includes information about a size of the second object (e.g., the second object 106 (e.g., the second other vehicle) illustrated in FIG. 2), then the instructions to determine that the actual position of the third object (e.g., the third object 202 (e.g., the third other vehicle) illustrated in FIG. 2) is the second possible position can include instructions that function to control the processor 302 to determine that a size of the third object is smaller than the size of the second object. That is, because: (1) the size of the third object is smaller than the size of the second object and (2) the first possible position is along the line formed by the second object and the vehicle, the first possible position cannot be the actual position of the third object and the processor 302 can determine that the second possible position is the actual position of the third object.

In the first alternative implementation, for example, the position determination module 308 can further include instructions that function to control the processor 302 to determine a velocity of the second object. For example, the memory 304 can further store an actuation module 310. The actuation module 310 can include instructions that function to control the processor 302 to cause, in response to a determination of the velocity of the second object, an actuation of a device disposed on the vehicle that improves a safety of an operation of the vehicle. With reference to FIG. 1, for example, in response to a determination of a velocity of the second object 106, an actuation of the device 116 can improve a safety of an operation of the vehicle 102. For example, the device 116 can cause one or more of a communication of a warning signal to an operator of the vehicle 102, an actuation of a brake to reduce a speed of the vehicle 102, a prevention of a communication of a signal to a throttle controller that causes the speed of the vehicle 102 to increase, or the like. For example, the warning signal can include one or more of a visual signal, an audio signal, a haptic signal, or the like.

Returning to FIG. 3, in the second alternative implementation, for example, the position determination module 308 can further include instructions that function to control the processor 302 to determine a velocity of the third object. For example, the memory 304 can further store an actuation module 310. The actuation module 310 can include instructions that function to control the processor 302 to cause, in response to a determination of the velocity of the third object, an actuation of a device disposed on the vehicle that improves a safety of an operation of the vehicle. With reference to FIG. 2, for example, in response to a determination of a velocity of the third object 202, an actuation of the device 116 can improve a safety of an operation of the vehicle 102. For example, the device 116 can cause one or more of a communication of a warning signal to an operator of the vehicle 102, an actuation of a brake to reduce a speed of the vehicle 102, a prevention of a communication of a signal to a throttle controller that causes the speed of the vehicle 102 to increase, or the like. For example, the warning signal can include one or more of a visual signal, an audio signal, a haptic signal, or the like.

Returning to FIG. 3, in the first alternative implementation, for example, the actual position of the second object can be outside of a field of view from the vehicle. With reference to FIG. 1, for example, the field of view from the vehicle can be a field of view 134 from the vehicle 102. Returning to FIG. 3, for example, the position determination module 308 can further include instructions that function to control the processor 302 to determine one or more locations of one or more obstacles that define the field of view. With reference to FIG. 1, for example, the first obstacle 108 and the second obstacle 110 can define the field of view 134. Returning to FIG. 3, for example, the instructions to determine the one or more locations of the one or more obstacles that define the field of view can include instructions that function to control the processor 302 to determine, from a reflection of an electromagnetic energy, the one or more locations of the one or more obstacles that define the field of view. With reference to FIG. 1, for example: (1) the location of the first obstacle 108 can be determined from a reflection 136 of an electromagnetic energy 138 from the first obstacle 108 and (2) the location of the second obstacle 110 can be determined from a reflection 140 of an electromagnetic energy 142 from the second obstacle 110. Returning to FIG. 3, for example, the system 300 can further include a data store 320. The data store 312 can be communicably coupled to the processor 302. The data store 312 can store, for example, a high definition map 314. The instructions to determine the one or more locations of the one or more obstacles that define the field of view can include instructions that function to control the processor 302 to determine, from the high definition map 314, the one or more locations of the one or more obstacles that define the field of view.

In the second alternative implementation, for example, the actual position of the third object can be outside of a field of view from the vehicle. With reference to FIG. 2, for example, the field of view from the vehicle can be a field of view 220 from the vehicle 102. Returning to FIG. 3, for example, the position determination module 308 can further include instructions that function to control the processor 302 to determine one or more locations of one or more obstacles that define the field of view. With reference to FIG. 2, for example, the first obstacle 108 and the second obstacle 110 can define the field of view 220. Returning to FIG. 3, for example, the instructions to determine the one or more locations of the one or more obstacles that define the field of view can include instructions that function to control the processor 302 to determine, from a reflection of an electromagnetic energy, the one or more locations of the one or more obstacles that define the field of view. With reference to FIG. 2, for example: (1) the location of the first obstacle 108 can be determined from a reflection 222 of an electromagnetic energy 224 from the first obstacle 108 and (2) the location of the second obstacle 110 can be determined from a reflection 226 of an electromagnetic energy 228 from the second obstacle 110. Returning to FIG. 3, for example, the system 300 can further include a data store 312. The data store 312 can be communicably coupled to the processor 302. The data store 312 can store, for example, a high definition map 314. The instructions to determine the one or more locations of the one or more obstacles that define the field of view can include instructions that function to control the processor 302 to determine, from the high definition map 314, the one or more locations of the one or more obstacles that define the field of view.

Figure 4:
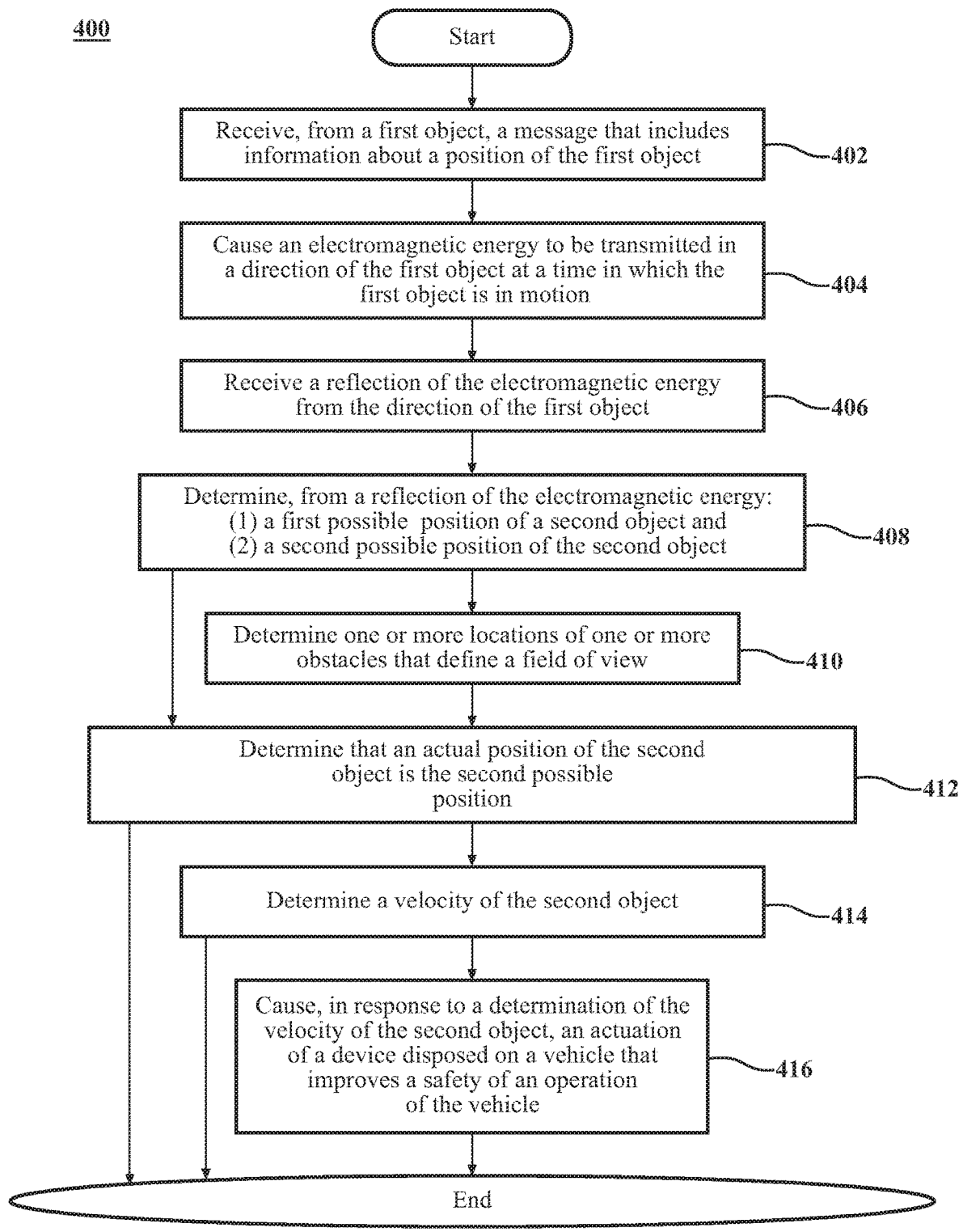
FIG. 4 includes a flow diagram that illustrates a first example of a method that is associated with detecting an object, according to the disclosed technologies.

FIG. 4 includes a flow diagram that illustrates a first example of a method 400 that is associated with detecting an object, according to the disclosed technologies. The method 400 is described from the perspective of the system 300 illustrated in FIG. 3. Although the method 400 is described in combination with the system 300, one of skill in the art understands, in light of the description herein, that the method 400 is not limited to being implemented by the system 300. Rather, the system 300 is an example of a system that may be used to implement the method 400.

In FIG. 4, in the method 400, at an operation 402, the processor 302, disposed on a vehicle (e.g., the vehicle 102 illustrated in FIG. 1), can receive, from a first object, a message. The message can include information about a position of the first object. For example, the processor 302 can receive the message through a wireless communication channel. For example, the wireless communications channel can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the message can include information about a size of the first object. For example, the message can include a Basic Safety Message (BSM).

At an operation 404, the detection and ranging device control module 306 can cause an electromagnetic energy to be transmitted in a direction of the first object at a time in which the first object is in motion. For example, the detection and ranging device control module 306 can cause a detection and ranging device to transmit the electromagnetic energy. For example, the detection and ranging device can include a radar device. For example, the radar device can include a millimeter wave radar device.

At an operation 406, the detection and ranging device control module 306 can receive a reflection of the electromagnetic energy from the direction of the first object.

At an operation 408, the position determination module 308 can determine, from the reflection of the electromagnetic energy: (1) a first possible position of a second object based on the reflection of the electromagnetic energy having traveled entirely along a path defined by a line formed by the first object and the vehicle and (2) a second possible position of the second object based on the reflection of the electromagnetic energy having traveled along a path outside of the line.

In an implementation, an actual position of the second object can be outside of a field of view from the vehicle. In this implementation, at an operation 410, the position determination module 308 can determine one or more locations of one or more obstacles that define the field of view. For example, the position determination module 308 can determine, from one or more of a reflection of an electromagnetic energy or the high definition map 312, the one or more locations of the one or more obstacles that define the field of view.

At an operation 412, the position determination module 308 can determine that the actual position of the second object is the second possible position of the second object. For example, the position determination module 308 can determine that a third object is at the first possible position of the second object. For example, if the message includes information about a size of the first object, then the position determination module 308 can determine that a size of the second object is smaller than a size of the first object. For example, the position determination module 308 can determine, in a manner that accounts for the motion of the first object, that the actual position of the second object is the second possible position of the second object.

In an implementation, at an operation 414, the position determination module 308 can determine a velocity of the second object.

In this implementation, at an operation 416, the actuation module 310 can cause, in response to a determination of the velocity of the second object, an actuation of a device disposed on the vehicle that improves a safety of an operation of the vehicle.

Figure 5:
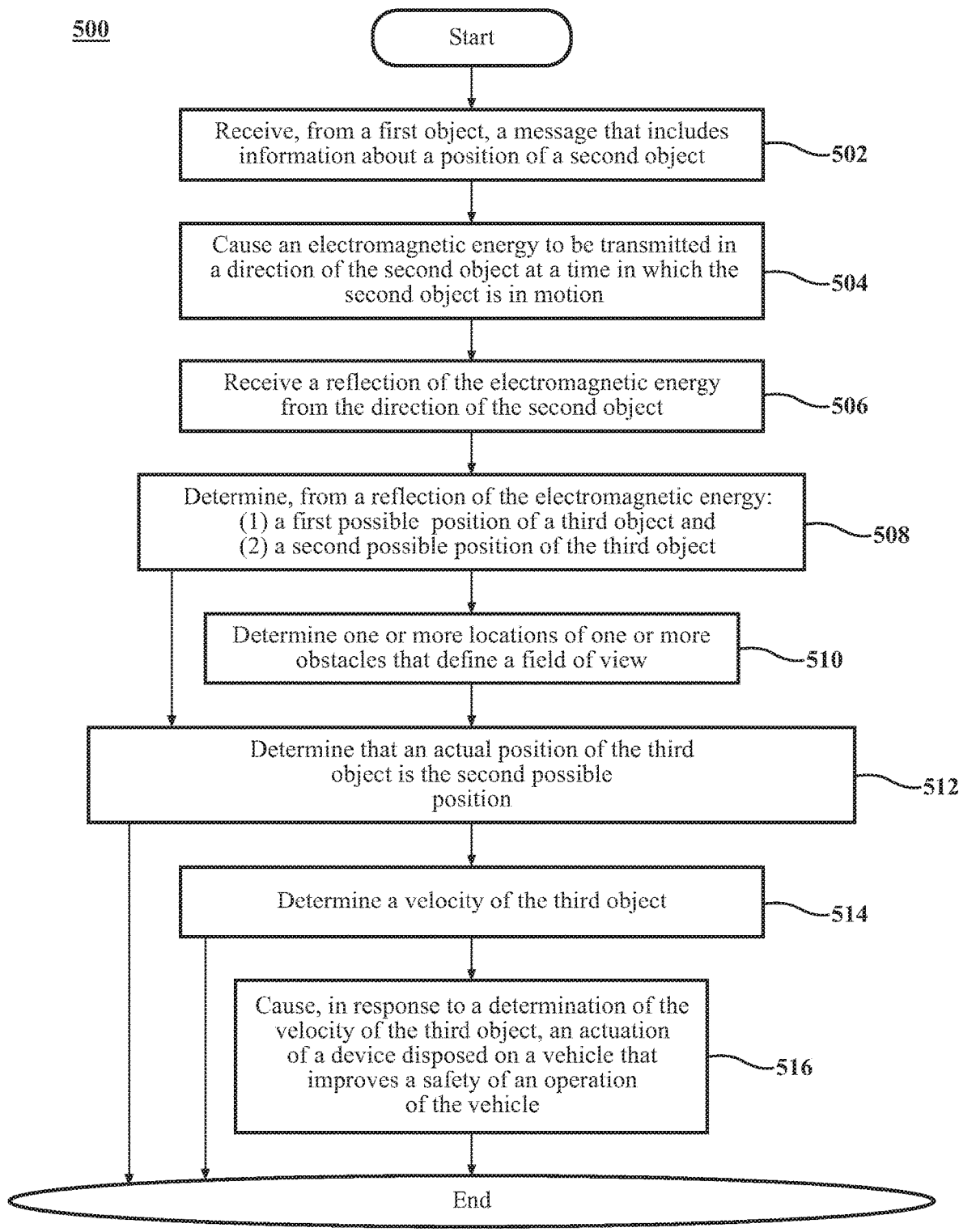
FIG. 5 includes a flow diagram that illustrates a second example of the method that is associated with detecting the object, according to the disclosed technologies.

FIG. 5 includes a flow diagram that illustrates a first example of the method 500 that is associated with detecting the object, according to the disclosed technologies. The method 500 is described from the perspective of the system 300 illustrated in FIG. 3. Although the method 500 is described in combination with the system 300, one of skill in the art understands, in light of the description herein, that the method 500 is not limited to being implemented by the system 300. Rather, the system 300 is an example of a system that may be used to implement the method 500.

In FIG. 5, in the method 500, at an operation 502, the processor 302, disposed on a vehicle (e.g., the vehicle 102 illustrated in FIG. 1), can receive, from a first object, a message. The message can include information about a position of a second object. For example, the processor 302 can receive the message through a wireless communications channel. For example, the wireless communications channel can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the message can include information about a size of the second object. For example, the message can include a Collective Perception Message (CPM). For example, the message may lack information about a position of a third object.

At an operation 504, the detection and ranging device control module 306 can cause an electromagnetic energy to be transmitted in a direction of the second object at a time in which the second object is in motion. For example, the detection and ranging device control module 306 can cause a detection and ranging device to transmit the electromagnetic energy. For example, the detection and ranging device can include a radar device. For example, the radar device can include a millimeter wave radar device. For example, the detection and ranging device control module 306 can cause the electromagnetic energy to be transmitted in response to a determination that the second object is within a range of a detection and ranging device that produces the electromagnetic energy.

At an operation 506, the detection and ranging device control module 306 can receive a reflection of the electromagnetic energy from the direction of the second object.

At an operation 508, the position determination module 308 can determine, from the reflection of the electromagnetic energy: (1) a first possible position of a third object based on the reflection of the electromagnetic energy having traveled entirely along a path defined by a line formed by the second object and the vehicle and (2) a second possible position of the third object based on the reflection of the electromagnetic energy having traveled along a path outside of the line.

In an implementation, an actual position of the third object can be outside of a field of view from the vehicle. In this implementation, at an operation 510, the position determination module 308 can determine one or more locations of one or more obstacles that define the field of view. For example, the position determination module 308 can determine, from one or more of a reflection of an electromagnetic energy or the high definition map 314, the one or more locations of the one or more obstacles that define the field of view.

At an operation 512, the position determination module 308 can determine that the actual position of the third object is the second possible position of the third object. For example, the position determination module 308 can determine that a fourth object is at the first possible position of the third object. For example, if the message includes information about a size of the second object, then the position determination module 308 can determine that a size of the third object is smaller than a size of the second object. For example, the position determination module 308 can determine, in a manner that accounts for the motion of the second object, that the actual position of the third object is the second possible position of the third object.

In an implementation, at an operation 514, the position determination module 308 can determine a velocity of the third object.

In this implementation, at an operation 516, the actuation module 310 can cause, in response to a determination of the velocity of the third object, an actuation of a device disposed on the vehicle that improves a safety of an operation of the vehicle.

Figure 6:
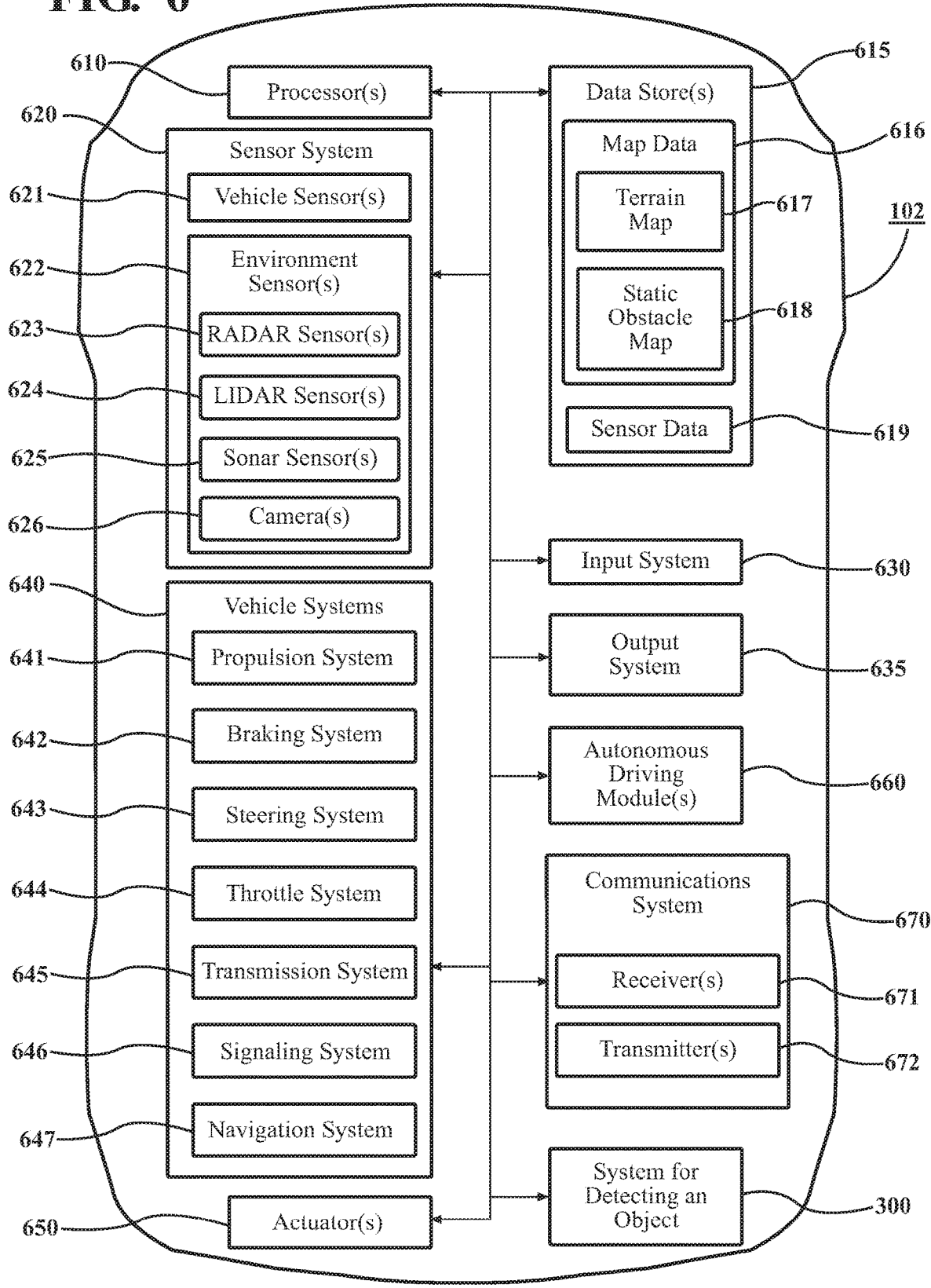
FIG. 6 includes a block diagram that illustrates an example of elements disposed on a vehicle, according to the disclosed technologies.

FIG. 6 includes a block diagram that illustrates an example of elements disposed on the vehicle 102, according to the disclosed technologies. As used herein, a "vehicle" can be any form of powered transport. In one or more implementations, the vehicle 102 can be an automobile. While arrangements described herein are with respect to automobiles, one of skill in the art understands, in light of the description herein, that embodiments are not limited to automobiles.

In some embodiments, the vehicle 102 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 102 is performed according to inputs received from a user (e.g., human driver). In one or more arrangements, the vehicle 102 can be a conventional vehicle that is configured to operate in only a manual mode.

In one or more embodiments, the vehicle 102 can be an automated vehicle. As used herein, "automated vehicle" can refer to a vehicle that operates in an automated mode. As used herein, "automated mode" can refer to navigating and/or maneuvering the vehicle 102 along a travel route using one or more computing systems to control the vehicle 102 with minimal or no input from a human driver. In one or more embodiments, the vehicle 102 can be highly automated or completely automated. In one embodiment, the vehicle 102 can be configured with one or more semi-automated operational modes in which one or more computing systems perform a portion of the navigation and/or maneuvering of the vehicle along a travel route, and a vehicle operator (i.e., driver) provides inputs to the vehicle 102 to perform a portion of the navigation and/or maneuvering of the vehicle 102 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 102 can include various elements. The vehicle 102 can have any combination of the various elements illustrated in FIG. 6. In various embodiments, it may not be necessary for the vehicle 102 to include all of the elements illustrated in FIG. 6. Furthermore, the vehicle 102 can have elements in addition to those illustrated in FIG. 6. While the various elements are illustrated in FIG. 6 as being located within the vehicle 102, one or more of these elements can be located external to the vehicle 102. Furthermore, the elements illustrated may be physically separated by large distances. For example, as described, one or more components of the disclosed system can be implemented within the vehicle 102 while other components of the system can be implemented within a cloud-computing environment, as described below. For example, the elements can include one or more processors 610, one or more data stores 615, a sensor system 620, an input system 630, an output system 635, vehicle systems 640, one or more actuators 650, one or more automated driving modules 660, a communications system 670, and the system 300 for detecting an object.

In one or more arrangements, the one or more processors 610 can be a main processor of the vehicle 102. For example, the one or more processors 610 can be an electronic control unit (ECU). For example, functions and/or operations of the processor 302 (illustrated in FIG. 3) can be realized by the one or more processors 610.

The one or more data stores 615 can store, for example, one or more types of data. For example, functions and/or operations of the memory 304 and/or the data store 320 (illustrated in FIG. 3) can be realized by the one or more data stores 615. The one or more data store 615 can include volatile memory and/or non-volatile memory. Examples of suitable memory for the one or more data stores 615 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 615 can be a component of the one or more processors 610. Additionally or alternatively, the one or more data stores 615 can be operatively connected to the one or more processors 610 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 615 can store map data 616. The map data 616 can include maps of one or more geographic areas. In some instances, the map data 616 can include information or data on roads, traffic control devices, road markings, structures, features, and/or landmarks in the one or more geographic areas. The map data 616 can be in any suitable form. In some instances, the map data 616 can include aerial views of an area. In some instances, the map data 616 can include ground views of an area, including 360-degree ground views. The map data 616 can include measurements, dimensions, distances, and/or information for one or more items included in the map data 616 and/or relative to other items included in the map data 616. The map data 616 can include a digital map with information about road geometry. The map data 616 can be high quality and/or highly detailed. For example, functions and/or operations of the high definition map 322 (illustrated in FIG. 3) can be realized by the map data 616.

In one or more arrangements, the map data 616 can include one or more terrain maps 617. The one or more terrain maps 617 can include information about the ground, terrain, roads, surfaces, and/or other features of one or more geographic areas. The one or more terrain maps 617 can include elevation data of the one or more geographic areas. The map data 616 can be high quality and/or highly detailed. The one or more terrain maps 617 can define one or more ground surfaces, which can include paved roads, unpaved roads, land, and other things that define a ground surface.

In one or more arrangements, the map data 616 can include one or more static obstacle maps 618. The one or more static obstacle maps 618 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 618 can have location data, size data, dimension data, material data, and/or other data associated with them. The one or more static obstacle maps 618 can include measurements, dimensions, distances, and/or information for one or more static obstacles. The one or more static obstacle maps 618 can be high quality and/or highly detailed. The one or more static obstacle maps 618 can be updated to reflect changes within a mapped area.

In one or more arrangements, the one or more data stores 615 can store sensor data 619. As used herein, "sensor data" can refer to any information about the sensors with which the vehicle 102 can be equipped including the capabilities of and other information about such sensors. The sensor data 619 can relate to one or more sensors of the sensor system 620. For example, in one or more arrangements, the sensor data 619 can include information about one or more lidar sensors 624 of the sensor system 620.

In some arrangements, at least a portion of the map data 616 and/or the sensor data 619 can be located in one or more data stores 615 that are located onboard the vehicle 102. Alternatively or additionally, at least a portion of the map data 616 and/or the sensor data 619 can be located in one or more data stores 615 that are located remotely from the vehicle 102.

The sensor system 620 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 620 includes a plurality of sensors, the sensors can work independently from each other. Alternatively, two or more of the sensors can work in combination with each other. In such a case, the two or more sensors can form a sensor network. The sensor system 620 and/or the one or more sensors can be operatively connected to the one or more processors 610, the one or more data stores 615, and/or another element of the vehicle 102 (including any of the elements illustrated in FIG. 6). The sensor system 620 can acquire data of at least a portion of the external environment of the vehicle 102 (e.g., nearby vehicles). The sensor system 620 can include any suitable type of sensor. Various examples of different types of sensors are described herein. However, one of skill in the art understands that the embodiments are not limited to the particular sensors described herein.

The sensor system 620 can include one or more vehicle sensors 621. The one or more vehicle sensors 621 can detect, determine, and/or sense information about the vehicle 102 itself. In one or more arrangements, the one or more vehicle sensors 621 can be configured to detect and/or sense position and orientation changes of the vehicle 102 such as, for example, based on inertial acceleration. In one or more arrangements, the one or more vehicle sensors 621 can include one or more accelerometers, one or more gyroscopes, an inertial measurement unit (IMU), a dead-reckoning system, a global navigation satellite system (GNSS), a global positioning system (GPS), a navigation system 647, and/or other suitable sensors. The one or more vehicle sensors 621 can be configured to detect and/or sense one or more characteristics of the vehicle 102. In one or more arrangements, the one or more vehicle sensors 621 can include a speedometer to determine a current speed of the vehicle 102.

Alternatively or additionally, the sensor system 620 can include one or more environment sensors 622 configured to acquire and/or sense driving environment data. As used herein, "driving environment data" can include data or information about the external environment in which a vehicle is located or one or more portions thereof. For example, the one or more environment sensors 622 can be configured to detect, quantify, and/or sense obstacles in at least a portion of the external environment of the vehicle 102 and/or information/data about such obstacles. Such obstacles may be stationary objects and/or dynamic objects. The one or more environment sensors 622 can be configured to detect, measure, quantify, and/or sense other things in the external environment of the vehicle 102 such as, for example, lane markers, signs, traffic lights, traffic signs, lane lines, crosswalks, curbs proximate the vehicle 102, off-road objects, etc.

Various examples of sensors of the sensor system 620 are described herein. The example sensors may be part of the one or more vehicle sensors 621 and/or the one or more environment sensors 622. However, one of skill in the art understands that the embodiments are not limited to the particular sensors described.

In one or more arrangement, the one or more environment sensors 622 can include one or more radar sensors 623, one or more lidar sensors 624, one or more sonar sensors 625, and/or one more cameras 626. In one or more arrangements, the one or more cameras 626 can be one or more high dynamic range (HDR) cameras or one or more infrared (IR) cameras. For example, the one or more cameras 626 can be used to record a reality of a state of an item of information that can appear in digital map. For example, functions and/or operations of the detection and ranging device 114 (illustrated in FIGS. 1 and 2) can be realized by one of the one or more environment sensors 622.

The input system 630 can include any device, component, system, element, arrangement, or groups thereof that enable information/data to be entered into a machine. The input system 630 can receive an input from a vehicle passenger (e.g., a driver or a passenger). The output system 635 can include any device, component, system, element, arrangement, or groups thereof that enable information/data to be presented to a vehicle passenger (e.g., a driver or a passenger).

Various examples of the one or more vehicle systems 640 are illustrated in FIG. 6. However, one of skill in the art understands that the vehicle 102 can include more, fewer, or different vehicle systems. Although particular vehicle systems can be separately defined, each or any of the systems or portions thereof may be otherwise combined or segregated via hardware and/or software within the vehicle 102. For example, the one or more vehicle systems 640 can include a propulsion system 641, a braking system 642, a steering system 643, a throttle system 644, a transmission system 645, a signaling system 646, and/or the navigation system 647. Each of these systems can include one or more devices, components, and/or a combination thereof, now known or later developed.

The navigation system 647 can include one or more devices, applications, and/or combinations thereof, now known or later developed, configured to determine the geographic location of the vehicle 102 and/or to determine a travel route for the vehicle 102. The navigation system 647 can include one or more mapping applications to determine a travel route for the vehicle 102. The navigation system 647 can include a global positioning system, a local positioning system, a geolocation system, and/or a combination thereof.

The one or more actuators 650 can be any element or combination of elements operable to modify, adjust, and/or alter one or more of the vehicle systems 640 or components thereof responsive to receiving signals or other inputs from the one or more processors 610 and/or the one or more automated driving modules 660. Any suitable actuator can be used. For example, the one or more actuators 650 can include motors, pneumatic actuators, hydraulic pistons, relays, solenoids, and/or piezoelectric actuators. For example, functions and/or operations of the device 116 (illustrated in FIGS. 1 and 2) can be realized by one of the one or more actuators 650.

The one or more processors 610 and/or the one or more automated driving modules 660 can be operatively connected to communicate with the various vehicle systems 640 and/or individual components thereof. For example, the one or more processors 610 and/or the one or more automated driving modules 660 can be in communication to send and/or receive information from the various vehicle systems 640 to control the movement, speed, maneuvering, heading, direction, etc. of the vehicle 102. The one or more processors 610 and/or the one or more automated driving modules 660 may control some or all of these vehicle systems 640 and, thus, may be partially or fully automated.

The one or more processors 610 and/or the one or more automated driving modules 660 may be operable to control the navigation and/or maneuvering of the vehicle 102 by controlling one or more of the vehicle systems 640 and/or components thereof. For example, when operating in an automated mode, the one or more processors 610 and/or the one or more automated driving modules 660 can control the direction and/or speed of the vehicle 102. The one or more processors 610 and/or the one or more automated driving modules 660 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 670 can include one or more receivers 671 and/or one or more transmitters 672. The communications system 670 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 670 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The vehicle 102 can include one or more modules, at least some of which are described herein. The modules can be implemented as computer-readable program code that, when executed by the one or more processors 610, implement one or more of the various processes described herein. One or more of the modules can be a component of the one or more processors 610. Alternatively or additionally, one or more of the modules can be executed on and/or distributed among other processing systems to which the one or more processors 610 can be operatively connected. The modules can include instructions (e.g., program logic) executable by the one or more processors 610. Alternatively or additionally, the one or more data store 615 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 102 can include one or more automated driving modules 660. The one or more automated driving modules 660 can be configured to receive data from the sensor system 620 and/or any other type of system capable of capturing information relating to the vehicle 102 and/or the external environment of the vehicle 102. In one or more arrangements, the one or more automated driving modules 660 can use such data to generate one or more driving scene models. The one or more automated driving modules 660 can determine position and velocity of the vehicle 102. The one or more automated driving modules 660 can determine the location of obstacles, obstacles, or other environmental features including traffic signs, trees, shrubs, neighboring vehicles, pedestrians, etc.

The one or more automated driving modules 660 can be configured to receive and/or determine location information for obstacles within the external environment of the vehicle 102 for use by the one or more processors 610 and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The one or more automated driving modules 660 can be configured to determine one or more travel paths, current automated driving maneuvers for the vehicle 102, future automated driving maneuvers and/or modifications to current automated driving maneuvers based on data acquired by the sensor system 620, driving scene models, and/or data from any other suitable source such as determinations from the sensor data 619. As used herein, "driving maneuver" can refer to one or more actions that affect the movement of a vehicle. Examples of driving maneuvers include: accelerating, decelerating, braking, turning, moving in a lateral direction of the vehicle 102, changing travel lanes, merging into a travel lane, and/or reversing, just to name a few possibilities. The one or more automated driving modules 660 can be configured to implement determined driving maneuvers. The one or more automated driving modules 660 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 660 can be configured to execute various vehicle functions and/or to transmit data to, receive data from, interact with, and/or control the vehicle 102 or one or more systems thereof (e.g., one or more of vehicle systems 640). For example, functions and/or operations of an automotive navigation system can be realized by the one or more automated driving modules 660.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 3-5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for detecting an object, the system comprising:
one or more processors disposed on a vehicle and configured to receive, from a first object, a message, the message including information about a position of the first object;
a memory communicably coupled to the one or more processors and storing:
a detection and ranging device control module including instructions that when executed by the one or more processors cause the one or more processors to:
cause an electromagnetic energy to be transmitted in a direction of the first object at a time in which the first object is in motion; and
receive a reflection of the electromagnetic energy from the direction of the first object; and
a position determination module including instructions that when executed by the one or more processors cause the one or more processors to:
determine, from the reflection of the electromagnetic energy,
a first possible position of a second object based on the reflection of the electromagnetic energy having traveled entirely along a first path, the first path being defined by a line formed by the first object and the vehicle, the first path having a first distance, the first distance being equal to a sum of a distance between the vehicle and the first object added to a distance between the first object and the first possible position;
determine, from the reflection of the electromagnetic energy,
a second possible position of the second object based on the reflection of the electromagnetic energy having traveled along a second path, the second path being at least partially outside of the line, the second path having a second distance, the second distance being equal to the sum of the distance between the vehicle and the first object added to a distance between the first object and the second possible position, the second distance being equal to the first distance; and
determine, based on an analysis of at least one of a characteristic of the first object, a characteristic of the first possible position, or a relationship between a size of the first object and a size of the second object, that an actual position of the second object is the second possible position of the second object.

2. The system of claim 1, wherein the one or more processors are configured to receive the message through a wireless communications channel.

3. The system of claim 1, wherein the message comprises a Basic Safety Message.

4. The system of claim 1, wherein the instructions to cause the electromagnetic energy to be transmitted include instructions that when executed by the one or more processors cause the one or more processors to cause a detection and ranging device to transmit the electromagnetic energy.

5. The system of claim 4, wherein the detection and ranging device comprises a radar device.

6. The system of claim 5, wherein the radar device comprises a millimeter wave radar device.

7. The system of claim 1, wherein the instructions to determine that the actual position of the second object is the second possible position of the second object include instructions that when executed by the one or more processors cause the one or more processors to determine, in a manner that accounts for the motion of the first object, that the actual position of the second object is the second possible position of the second object.

8. The system of claim 1, wherein:
the message includes information about the size of the first object; and
the instructions to determine that the actual position of the second object is the second possible position of the second object include instructions that when executed by the one or more processors cause the one or more processors to:
determine that a third object is at the first possible position of the second object, or
determine that the size of the second object is smaller than the size of the first object.

9. The system of claim 1, wherein the position determination module further includes instructions that when executed by the one or more processors cause the one or more processors to determine a velocity of the second object.

10. The system of claim 9, wherein the memory further stores an actuation module that when executed by the one or more processors cause the one or more processors to cause, in response to a determination of the velocity of the second object, an actuation of a device disposed on the vehicle that improves a safety of an operation of the vehicle.

11. The system of claim 1, wherein the actual position of the second object is outside of a field of view from the vehicle.

12. The system of claim 11, wherein the position determination module further includes instructions that when executed by the one or more processors cause the one or more processors to determine at least one location of at least one obstacle that defines the field of view.

13. The system of claim 12, wherein the instructions to determine the at least one location of the at least one obstacle include instructions that when executed by the one or more processors cause the one or more processors to determine, from at least one of the reflection of the electromagnetic energy or a high definition map, the at least one location of the at least one obstacle that defines the field of view.

14. A system for detecting an object, the system comprising:
one or more processors disposed on a vehicle and configured to receive, from a first object, a message, the message including information about a position of a second object;
a memory communicably coupled to the one or more processors and storing:
a detection and ranging device control module including instructions that when executed by the one or more processors cause the one or more processors to:
cause an electromagnetic energy to be transmitted in a direction of the second object at a time in which the second object is in motion; and
receive a reflection of the electromagnetic energy from the direction of the second object; and
a position determination module including instructions that when executed by the one or more processors cause the one or more processors to:
determine, from the reflection of the electromagnetic energy,
a first possible position of a third object based on the reflection of the electromagnetic energy having traveled entirely along a first path, the first path being defined by a line formed by the second object and the vehicle, the first path having a first distance, the first distance being equal to a sum of a distance between the vehicle and the second object added to a distance between the second object and the first possible position;
determine, from the reflection of the electromagnetic energy,
a second possible position of the third object based on the reflection of the electromagnetic energy having traveled along a second path, the second path being at least partially outside of the line, the second path having a second distance, the second distance being equal to the sum of the distance between the vehicle and the second object added to a distance between the second object and the second possible position, the second distance being equal to the first distance; and
determine, based on an analysis of at least one of a characteristic of at least one of the first object or the second object, a characteristic of the first possible position, or a relationship between a size of the second object and a size of the third object, that an actual position of the third object is the second possible position of the third object.

15. The system of claim 14, wherein the message comprises a Collective Perception Message.

16. The system of claim 14, wherein the message lacks information about a position of the third object.

17. The system of claim 14, wherein the instructions to cause the electromagnetic energy to be transmitted include instructions that when executed by the one or more processors cause the one or more processors to cause the electromagnetic energy to be transmitted in response to a determination that the second object is within a range of a detection and ranging device that produces the electromagnetic energy.

18. The system of claim 14, wherein the instructions to determine that the actual position of the third object is the second possible position of the second object include instructions that when executed by the one or more processors cause the one or more processors to determine, in a manner that accounts for the motion of at least one of the first object or the second object, that the actual position of the third object is the second possible position of the third object.

19. A method for detecting an object, the method comprising:
- receiving, by a processor disposed on a vehicle and from a first object, a message, the message including information about a position of the first object;
- causing, by the processor, an electromagnetic energy to be transmitted in a direction of the first object at a time in which the first object is in motion;
- receiving, by the processor, a reflection of the electromagnetic energy from the direction of the first object;
- determining, by the processor and from the reflection of the electromagnetic energy,
   - a first possible position of a second object based on the reflection of the electromagnetic energy having traveled entirely along a first path, the first path being defined by a line formed by the first object and the vehicle, the first path having a first distance, the first distance being equal to a sum of a distance between the vehicle and the first object added to a distance between the first object and the first possible position;
- determining, by the processor and from the reflection of the electromagnetic energy,
   - a second possible position of the second object based on the reflection of the electromagnetic energy having traveled along a second path, the second path being at least partially outside of the line, the second path having a second distance, the second distance being equal to the sum of the distance between the vehicle and the first object added to a distance between the first object and the second possible position, the second distance being equal to the first distance; and
- determining, by the processor and based on an analysis of at least one of a characteristic of the first object, a characteristic of the first possible position, or a relationship between a size of the first object and a size of the second object, that an actual position of the second object is the second possible position of the second object.

20. The method of claim 19, wherein:
- the message includes information about the size of the first object; and
- the determining that the actual position of the second object is the second possible position of the second object comprises at least one of:
   - determining that a third object is at the first possible position of the second object, or
   - determining that the size of the second object is smaller than the size of the first object.

* * * * *